(12) United States Patent
Nakamura et al.

(10) Patent No.: US 8,707,671 B2
(45) Date of Patent: Apr. 29, 2014

(54) FUEL CONTROL METHOD AND FUEL CONTROL APPARATUS FOR GAS TURBINE AND GAS TURBINE

(75) Inventors: Sosuke Nakamura, Hyogo-ken (JP);
Satoshi Tanimura, Hyogo-ken (JP);
Shinji Akamatsu, Hyogo-ken (JP);
Shinsuke Nakamura, Hyogo-ken (JP);
Takashi Sonoda, Hyogo-ken (JP);
Akihiko Saito, Hyogo-ken (JP); Makoto Kishi, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 1096 days.

(21) Appl. No.: 12/671,473

(22) PCT Filed: Jul. 1, 2009

(86) PCT No.: PCT/JP2009/062048
§ 371 (c)(1),
(2), (4) Date: Jan. 29, 2010

(87) PCT Pub. No.: WO2010/038528
PCT Pub. Date: Apr. 8, 2010

(65) Prior Publication Data
US 2011/0016873 A1    Jan. 27, 2011

(30) Foreign Application Priority Data

Oct. 1, 2008 (JP) ................................. 2008-256530

(51) Int. Cl.
*F02C 9/32* (2006.01)
*F02C 9/28* (2006.01)
*F23R 3/34* (2006.01)

(52) U.S. Cl.
USPC ........... 60/39.281; 60/39.21; 60/747; 60/737; 60/746

(58) Field of Classification Search
USPC ........... 60/746, 747, 39.21, 39.281, 804, 737, 60/776
See application file for complete search history.

(56) References Cited

U.S. PATENT DOCUMENTS 3,595,021 A * 7/1971 Tissier ........................... 60/243
4,716,719 A * 1/1988 Takahashi et al. .............. 60/773
(Continued)

FOREIGN PATENT DOCUMENTS

CN    101255821    9/2008
EP    1391657 A2    2/2004
(Continued)

OTHER PUBLICATIONS

PCT/JP2009/062048 International Search Report.

(Continued)

*Primary Examiner* — William H Rodriguez
*Assistant Examiner* — Carlos A Rivera
(74) *Attorney, Agent, or Firm* — Lowe Hauptman & Ham, LLP

(57) ABSTRACT

A fuel control method for a gas turbine with a combustor being formed of at least two groups of a pluralities of main nozzles for supplying fuel, and that supplies fuel from the main nozzles of all groups upon ignition of the combustor (S1), and supplies fuel from three main nozzles of a group A during subsequent acceleration of the gas turbine (S3). Because fuel is injected from a small number of the main nozzles during acceleration, the fuel flow rate per one main nozzle is increased, thereby increasing the fuel-air ratio (fuel flow rate/air flow rate) in a combustion region and improving the combustion characteristics. Accordingly, the generation of carbon monoxide and unburned hydrocarbon is reduced, whereby no bypass valve is required and manufacturing costs are reduced. Because fuel is supplied from the main nozzles of all groups and burned in the entire area of the combustor upon ignition, it is possible to easily propagate a flame to all the other adjacent main nozzle groups, thereby improving the ignition characteristics of the whole gas turbine.

4 Claims, 8 Drawing Sheets

(56) References Cited

U.S. PATENT DOCUMENTS

| | | | |
|---|---|---|---|
| 4,982,570 A * | 1/1991 | Waslo et al. | 60/733 |
| 5,339,635 A * | 8/1994 | Iwai et al. | 60/733 |
| 5,729,968 A * | 3/1998 | Cohen et al. | 60/39.6 |
| 5,806,299 A * | 9/1998 | Bauermeister et al. | 60/776 |
| 5,924,275 A * | 7/1999 | Cohen et al. | 60/778 |
| 6,370,863 B2 * | 4/2002 | Muller et al. | 60/776 |
| 6,874,323 B2 * | 4/2005 | Stuttaford | 60/776 |
| 7,051,533 B2 * | 5/2006 | Baino et al. | 60/773 |
| 2004/0035114 A1* | 2/2004 | Hayashi et al. | 60/737 |
| 2006/0101814 A1 | 5/2006 | Saitoh et al. | |
| 2008/0209910 A1 | 9/2008 | Verdier | |
| 2009/0077973 A1* | 3/2009 | Hu et al. | 60/741 |

FOREIGN PATENT DOCUMENTS

| | | |
|---|---|---|
| EP | 1 555 407 A1 | 7/2005 |
| JP | 7-55149 A | 3/1995 |
| JP | 09-166326 A | 6/1997 |
| JP | 9-287483 A | 11/1997 |
| JP | 2001-073804 A | 3/2001 |
| JP | 2004-084490 A | 3/2004 |
| JP | 2004-143942 A | 5/2004 |
| JP | 2005-030667 A | 2/2005 |
| JP | 2006-145073 A | 6/2006 |
| JP | 2006-152818 | 6/2006 |
| JP | 2007-33025 A | 2/2007 |
| JP | 2007-154701 A | 6/2007 |
| JP | 2007-114279 | 11/2008 |

OTHER PUBLICATIONS

Chinese Office Action for Application No. 200980100071.6 mailed Apr. 6, 2012.

Notice of Allowance issued on Dec. 17, 2012 in Japanese Application No. 2008-256530, 5 pages.

Notification of the decision to grant a patent right dated Sep. 4, 2013, corresponds to Chinese patent application No. 200980100071.6.

* cited by examiner

FUEL CONTROL METHOD AND FUEL CONTROL APPARATUS FOR GAS TURBINE AND GAS TURBINE

RELATED APPLICATIONS

The present application is based on International Application PCT/JP2009/062048, filed Jul. 1, 2009 which claims priority from, Japan Application Number 2008-256530, filed Oct. 1, 2008, the disclosures of which are hereby incorporated by reference herein in their entirety.

TECHNICAL FIELD

The present invention relates to a fuel control method and a fuel control apparatus for a gas turbine, and to a gas turbine.

BACKGROUND ART

A gas turbine includes a compressor, a combustor, and a turbine. The compressor generates high-temperature and high-pressure compressed air by compressing air taken in from an air inlet port. The combustor generates high-temperature and high-pressure combustion gas by supplying fuel to the compressed air and burning them. The turbine includes a casing having a passage in which a plurality of turbine stator vanes and turbine rotor blades are alternately arranged. The combustion gas supplied to the passage is used to drive the turbine rotor blades, thereby, for example, rotatably driving a rotor connected to a generator. The combustion gas having driven the turbine is converted to static pressure by a diffuser and released to the atmosphere.

The combustor employs a premix combustion system in which a plurality of main nozzles for supplying fuel is arranged in the circumferential direction of the gas turbine. Some combustors are a cannular type in which a plurality of individual combustors is arranged in the circumferential direction of the gas turbine, and some others are an annular type that is integrally formed in a ring shape. Here, lean combustion takes place in the main nozzles by mixing air and fuel in advance. Accordingly, it is possible to suppress the combustion temperature, and reduce the generation of nitrogen oxides (NOx) due to combustion. However, in such a combustor, fuel is separately injected from the main nozzles, and under the condition when the load of the gas turbine is low such as during ignition and acceleration, the fuel flow rate per one main nozzle is low. Consequently, the fuel-air ratio (fuel flow rate/air flow rate) in the combustion region is reduced, thereby degrading the combustion characteristics. As a result, the generation of carbon monoxide (CO) and unburned hydrocarbon (UHC) is increased. To address them, the combustor includes a bypass valve, and the fuel-air ratio in the combustion region is controlled to be high, by bypassing a part of combustion air.

A conventional fuel control method is used to increase the fuel-air ratio in the combustion region, by dividing the main nozzles (main nozzle groups) into a first group and a second group, and at startup (during ignition and acceleration) and during low load operation when the fuel-air ratio is low, by supplying fuel only to the main nozzles of the first group while cutting the fuel flow to the main nozzles of the second group. Accordingly, the fuel flow rate per one main nozzle is increased (for example, see Patent document 1).

[Patent document 1] Japanese Patent Application Laid-open No. 2001-73804

DISCLOSURE OF INVENTION

Problem to be Solved by the Invention

However, in the conventional fuel control method, when fuel is supplied only to the main nozzles of the first group upon ignition, the ignition at the main nozzles of the first group is local combustion that takes place in a part of the combustor. Accordingly, it is difficult to propagate a flame to all the other adjacent main nozzle groups (in the cannular combustor, main nozzle groups of a plurality of other adjacent combustors), thereby degrading the ignition characteristics of the whole gas turbine.

The present invention has been made in view of the above circumstances, and is intended to provide a fuel control method and a fuel control apparatus for a gas turbine, and a gas turbine, that can improve the ignition characteristics of the whole gas turbine upon ignition, while reducing manufacturing costs and increasing the fuel-air ratio in the combustion region during acceleration.

Means for Solving Problem

According to an aspect of the present invention, a fuel control method for a gas turbine with a combustor including at least two groups of pluralities of main nozzles for supplying fuel, includes: supplying fuel from the main nozzles of all groups upon ignition of the combustor, and supplying fuel from the main nozzles of at least one group during subsequent acceleration of the gas turbine.

In the fuel control method for a gas turbine, during acceleration of the gas turbine, fuel is supplied from the main nozzles of at least one group. Accordingly, combustion gas is generated by injecting all the fuel from a small number of the main nozzles during an acceleration operation, thereby increasing the fuel flow rate per one main nozzle. Consequently, the fuel-air ratio (fuel flow rate/air flow rate) is increased, thereby improving the combustion characteristics. As a result, the generation of carbon monoxide (CO) and unburned hydrocarbon (UHC) can be reduced. Because the combustion characteristics are improved, a bypass valve that has been used is not necessary, thereby reducing manufacturing costs. Upon ignition of the combustor, fuel is supplied from the main nozzles of all the groups, and is ignited, and the fuel is then injected from the main nozzles of at least one group. Because the entire area of the combustor is burned at startup, it is possible to easily propagate a flame to all the other adjacent main nozzle groups, thereby improving the ignition characteristics of the whole gas turbine.

Advantageously, in the fuel control method for a gas turbine, the main nozzles of the group that supply fuel during acceleration of the gas turbine are adjacently arranged to each other.

In the fuel control method for a gas turbine, during acceleration of the gas turbine, fuel is supplied from the main nozzles arranged adjacent to each other. Accordingly, the fuel-air ratio (fuel flow rate/air flow rate) in the combustion region is increased, thereby further reducing the generation of carbon monoxide (CO) and unburned hydrocarbon (UHC).

Advantageously, in the fuel control method for a gas turbine, number of the main nozzles of a group that supply fuel during acceleration of the gas turbine is less than a half of total number of the main nozzles.

In the fuel control method for a gas turbine, during acceleration of the gas turbine, fuel is supplied from less than a half of the total number of the main nozzles. Accordingly, the fuel-air ratio (fuel flow rate/air flow rate) that can further reduce the generation of carbon monoxide (CO) and unburned hydrocarbon (UHC) can be obtained.

According to another aspect of the present invention, a fuel control apparatus for a gas turbine with a combustor including at least two groups of pluralities of main nozzles for supplying fuel, with fuel supply valves being provided for each group of the main nozzles and supplying fuel to the main nozzles, the fuel supply valves being opened to change a supply amount of the fuel and being closed to prevent fuel from being supplied, and with an ignition detector detecting an ignition state of the combustor, includes: a fuel controlling unit that opens the fuel supply valves of the main nozzles of all groups upon ignition of the combustor, and after the ignition detector detects ignition of the combustor, while keeping the fuel supply valve of the main nozzles of at least one group open, closes the fuel supply valve(s) of the main nozzles of other group(s) during acceleration of the gas turbine.

The fuel control apparatus for a gas turbine performs the fuel control method by including the fuel controlling unit.

According to still another aspect of the present invention, a gas turbine that supplies combustion gas, obtained by supplying fuel to compressed air compressed by a compressor and burning the combustion gas and the fuel in a combustor, to a turbine to generate power, includes: a combustor being formed of at least two groups of pluralities of main nozzles for supplying fuel; fuel supply valves being provided for each group of the main nozzles and supply fuel to the main nozzles are opened to change a supply amount of the fuel and closed to prevent fuel from being supplied; an ignition detector that detects an ignition state of the combustor; and a fuel control apparatus that opens the fuel supply valves of the main nozzles of all groups upon ignition of the combustor, and after the ignition detector detects the ignition of the combustor, while keeping the fuel supply valve of the main nozzles of at least one group open, closes the fuel supply valve(s) of the main nozzles of other group(s) during acceleration During acceleration, the gas turbine supplies fuel from the main nozzles of at least one group. Accordingly, combustion gas is generated by injecting all the fuel from a small number of the main nozzles during an acceleration operation, thereby increasing the fuel flow rate per one main nozzle. Consequently, the fuel-air ratio (fuel flow rate/air flow rate) in the combustion region is increased, thereby improving the combustion characteristics. As a result, the generation of carbon monoxide (CO) and unburned hydrocarbon (UHC) can be reduced. Because the combustion characteristics are improved, a bypass valve that has been used is not necessary, thereby reducing manufacturing costs. Upon ignition of the combustor, fuel is supplied from the main nozzles of all the groups and ignited, and the fuel is then injected from the main nozzles of at least one group. Because the entire area of the combustor is burned at startup, it is possible to easily propagate a flame to all the other adjacent main nozzle groups, thereby improving the ignition characteristics of the whole gas turbine.

Effect of the Invention

With the present invention, it is possible to improve the ignition characteristics of the whole gas turbine upon ignition, while reducing manufacturing costs and increasing the fuel-air ratio in the combustion region during acceleration.

BEST MODE(S) FOR CARRYING OUT THE INVENTION

Exemplary embodiments of a fuel control method and a fuel control apparatus for a gas turbine, and a gas turbine, according to the present invention will now be described in detail with reference to the accompanying drawings. However, the present invention is not limited to the embodiments.

Figure 1:
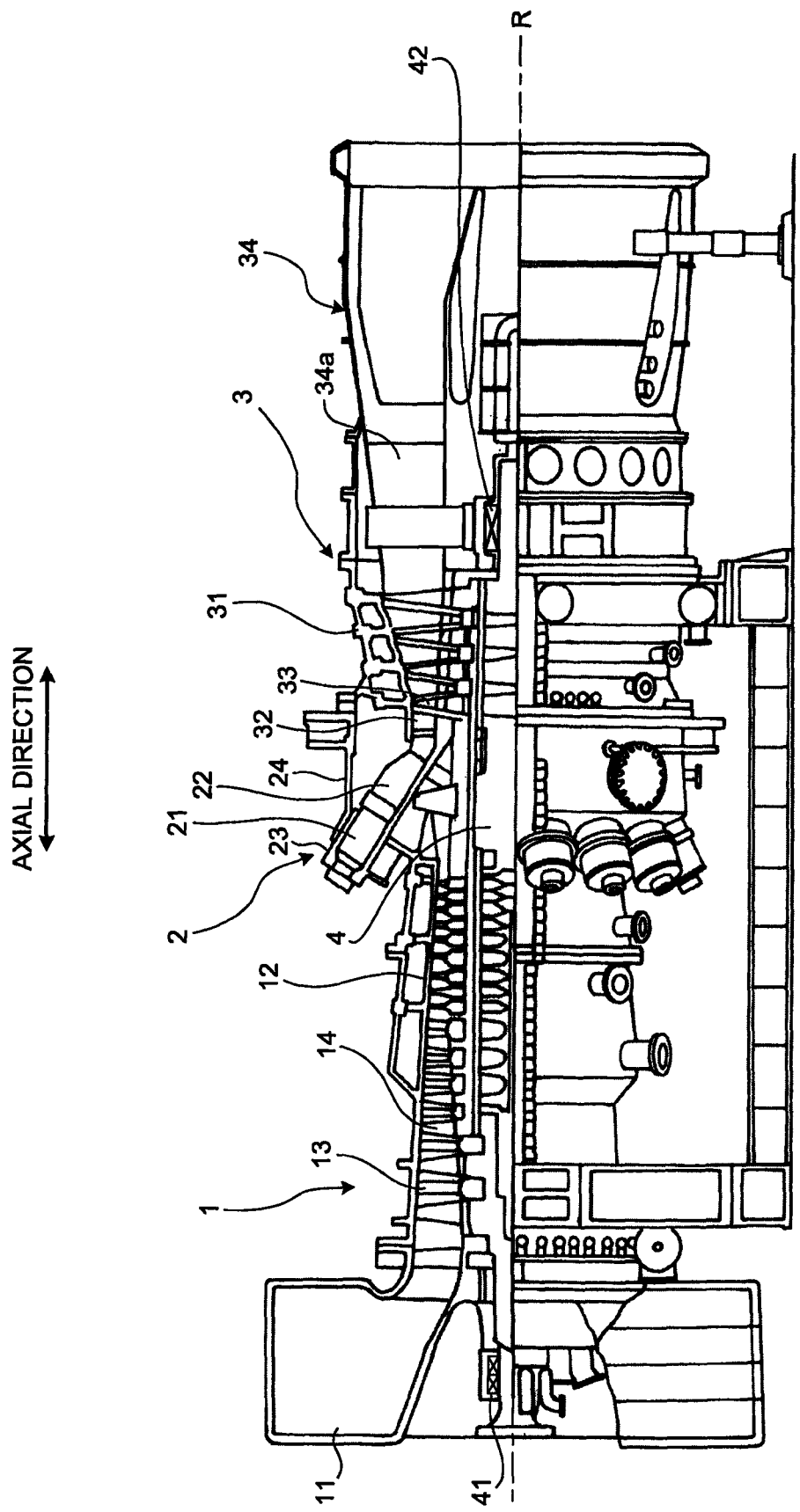
FIG. 1 is a schematic of a gas turbine according to an embodiment of the present invention.
Figure 2:
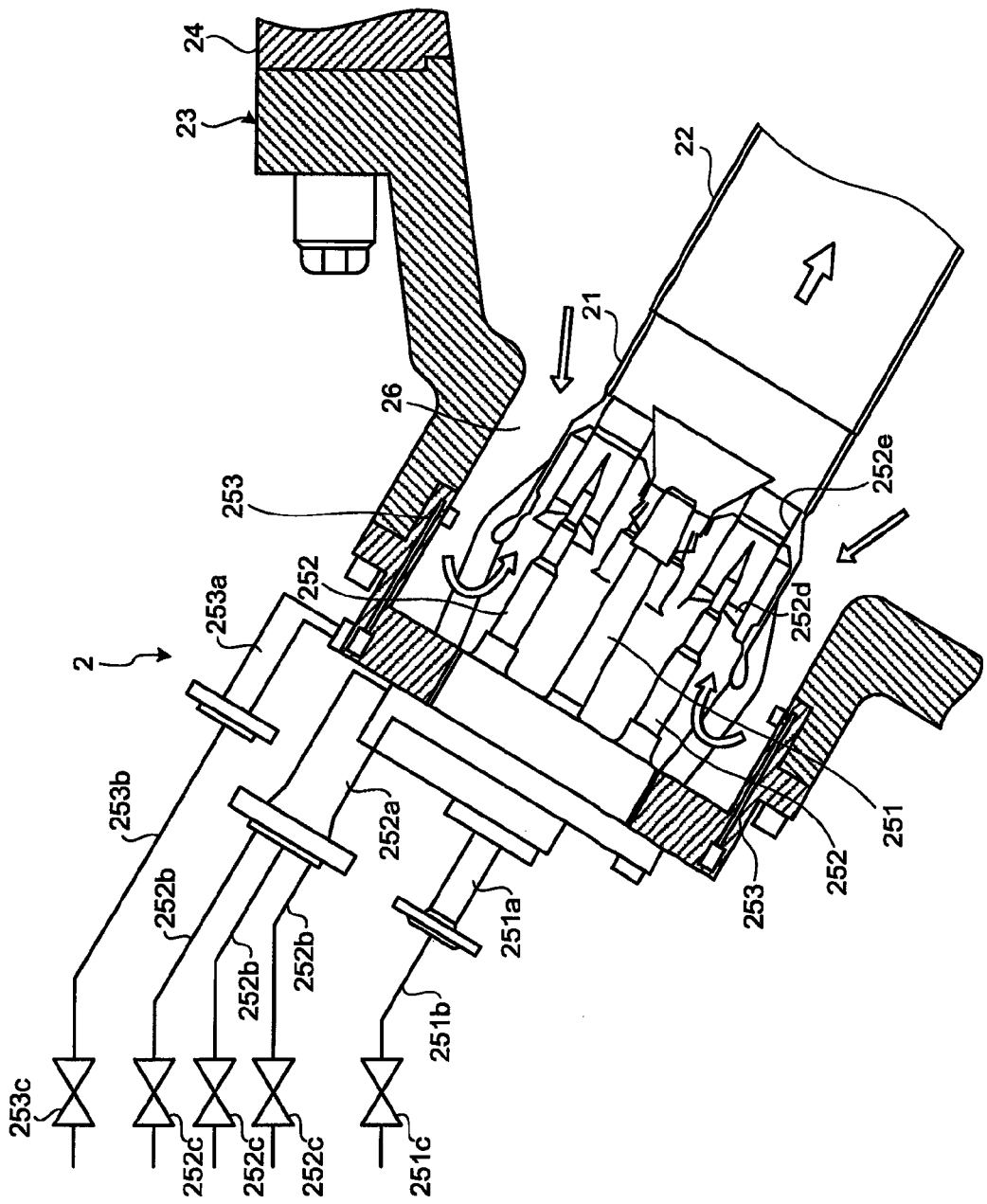
FIG. 2 is a schematic of a combustor of the gas turbine in FIG. 1.
Figure 3:
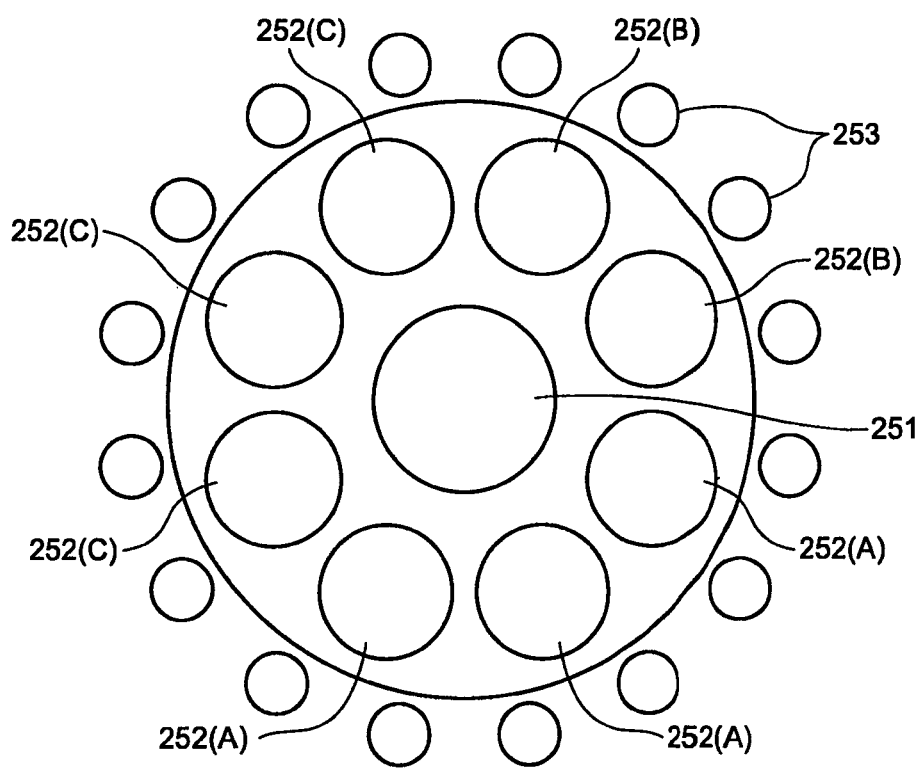
FIG. 3 is a sectional schematic view of FIG. 2.

FIG. 1 is a schematic of a gas turbine according to an embodiment of the present invention. FIG. 2 is a schematic of a combustor of the gas turbine in FIG. 1. FIG. 3 is a sectional schematic view of FIG. 2.

The gas turbine, as shown in FIG. 1, includes a compressor 1, a combustor 2, and a turbine 3. A rotor 4 is disposed to penetrate through the center portions of the compressor 1, the combustor 2, and the turbine 3. The compressor 1, the combustor 2, and the turbine 3 are sequentially arranged side-by-side from the front to the rear of the air flow, along a shaft center R of the rotor 4. In the following explanation, the axial direction is a direction parallel to the shaft center R, and the circumferential direction is a direction about the shaft center R.

The compressor 1 produces compressed air by compressing air. The compressor 1 includes a compressor stator vane 13 and a compressor rotor blade 14 in a compressor casing 12 having an air inlet port 11 from which air is taken in. A plurality of compressor stator vanes 13 is arranged side-by-side on the compressor casing 12 side in the circumferential direction. A plurality of compressor rotor blades 14 is arranged side-by-side on the rotor 4 in the circumferential direction. The compressor stator vanes 13 and the compressor rotor blades 14 are alternately arranged in the axial direction.

The combustor 2 generates high-temperature and high-pressure combustion gas, by supplying fuel to the compressed air compressed by the compressor 1. The combustor 2, as a combustion cylinder, includes an inner cylinder 21 in which compressed air and fuel are mixed and burned, a transition piece 22 that guides the combustion gas to the turbine 3 from the inner cylinder 21, and an outer casing 23 that covers the outer periphery of the inner cylinder 21 and includes an air passage 26 (see FIG. 2) that guides the compressed air to the inner cylinder 21 from the compressor 1. A plurality (such as 16) of combustors 2 is arranged side-by-side in the circumferential direction of a combustor casing 24. Such a structure of the combustor is called a cannular type.

Each of the combustors 2, as shown in FIGS. 2 and 3, includes nozzles 251, 252, and 253 for supplying fuel. The nozzle 251 is a pilot nozzle arranged in the center of the inner cylinder 21. The pilot nozzle 251 is connected to a pilot fuel line 251b through a fuel port 251a provided at the outside of the combustor 2. The pilot fuel line 251b includes a pilot fuel supply valve 251c. Specifically, fuel is supplied to the pilot nozzle 251 by opening the pilot fuel supply valve 251c, thereby injecting the fuel from the pilot nozzle 251. The pilot fuel supply valve 251c is formed so that the fuel supply amount can be changed by opening the valve. The supply of fuel to the pilot nozzle 251 is stopped by closing the pilot fuel supply valve 251c, thereby stopping the fuel from being injected from the pilot nozzle 251. The pilot fuel supply valve 251c is driven to be opened or closed by a pilot fuel supply valve driving unit 53 (see FIG. 4) serving as an actuator or a motor, for example.

A plurality (eight in the present embodiment) of main nozzles 252 is arranged adjacent to each other around the pilot nozzle 251 in the inner cylinder 21 in the circumferential direction. The main nozzles 252 are divided into a plurality of groups. In the present embodiment, as shown in FIG. 3, eight main nozzles 252 are divided into main nozzles 252(A) of a group A (first group) in which three aligned main nozzles 252 are in one group, main nozzles 252(B) of a group B (second group) in which two aligned main nozzles 252 adjacent to the group A are in one group, and main nozzles 252(C) of a group C in which the remaining three aligned main nozzles 252 are in one group. The main nozzles 252 of the groups A, B, and C are connected to main fuel lines 252b corresponding to each of the groups through a fuel port 252a extended outside of the combustor 2. Each of the main fuel lines 252b includes a main fuel supply valve 252c. Specifically, fuel is supplied to the groups of the main nozzles 252 by opening the main fuel supply valves 252c, thereby injecting the fuel from the groups of the main nozzles 252. Each of the main fuel supply valves 252c is formed so that the fuel supply amount can be changed by opening the valve. The supply of fuel to the groups of the main nozzles 252 is stopped, by closing the main fuel supply valves 252c, thereby stopping the fuel from being injected from the groups of the main nozzles 252. The main fuel supply valves 252c of the groups are driven to be opened or closed by a group A main fuel supply valve driving unit 54, a group B main fuel supply valve driving unit 55, and a group C main fuel supply valve driving unit 56 (see FIG. 4) that each serve as an actuator or a motor, for example. Swirler vanes 252d are provided at the outside of each of the main nozzles 252, and a burner tube 252e covers the periphery.

A plurality (16 in the present embodiment) of top hat nozzles 253 is arranged adjacent to each other also around the main nozzles 252 in the circumferential direction, along the inner peripheral surface of the outer casing 23. The top hat nozzles 253 are connected to a top hat fuel line 253b through a fuel port 253a arranged at the outside of the combustor 2. The top hat fuel line 253b includes a top hat fuel supply valve 253c. Specifically, fuel is supplied to the top hat nozzles 253 by opening the top hat fuel supply valve 253c, thereby injecting the fuel from the top hat nozzles 253. The top hat fuel supply valve 253c is formed so that the fuel supply amount can be changed by opening the valve. The supply of fuel to the top hat nozzles 253 is stopped by closing the top hat fuel supply valve 253c, thereby stopping fuel from being injected from the top hat nozzles 253. The top hat fuel supply valve 253c is driven to be opened or closed by a top hat fuel supply valve driving unit 57 (see FIG. 4) serving as an actuator or a motor, for example.

In the combustor 2, as shown in FIG. 2, an air flow of high-temperature and high-pressure compressed air flows into the air passage 26, and the compressed air is mixed with fuel injected from the top hat nozzles 253, formed into a fuel-air mixture, and flows into the inner cylinder 21. In the inner cylinder 21, the fuel-air mixture is mixed with fuel injected from the main nozzles 252, becomes a swirl flow of fuel-air premix by the swirler vanes 252d and the burner tube 252e, and flows into the transition piece 22. The fuel-air mixture is mixed with fuel injected from the pilot nozzle 251, ignited by a pilot light, which is not shown, is burned, and jetted into the transition piece 22 as combustion gas. At this time, a part of the combustion gas is jetted into the transition piece 22 so as to diffuse to the surrounding areas with a flame. Accordingly, the fuel-air premix from the burner tube 252e of each of the main nozzles 252 is ignited and burned. In other words, flame holding for stabilizing the combustion of the fuel-air premix supplied from the burner tube 252e of each of the main nozzles 252, is carried out by a diffusion flame generated by the fuel injected from the pilot nozzle 251.

The turbine 3 generates rotational power from the combustion gas burned in the combustor 2. The turbine 3 has a turbine casing 31 in which a turbine stator vane 32 and a turbine rotor blade 33 are arranged. A plurality of turbine stator vanes 32 is arranged side-by-side on the turbine casing 31 side in the circumferential direction. A plurality of turbine rotor blades 33 is arranged side-by-side on the rotor 4 side in the circumferential direction. The turbine stator vanes 32 and the turbine rotor blades 33 are alternately arranged in the axial direction. An exhaust chamber 34 including an exhaust diffuser 34a continuous to the turbine 3 is arranged at the rear of the turbine casing 31.

An end of the rotor 4 at the side of the compressor 1 is supported by a bearing 41, and an end of the rotor 4 at the side of the exhaust chamber 34 is supported by a bearing 42. The rotor 4 is rotatably arranged about the shaft center R. A driving shaft of a generator (not shown) is connected to the end of the rotor 4 at the side of the exhaust chamber 34.

In such a gas turbine, air taken in from the air inlet port 11 of the compressor 1 becomes high-temperature and high-pressure compressed air, by passing through the compressor stator vanes 13 and the compressor rotor blades 14 and by being compressed. High-temperature and high-pressure combustion gas is generated by supplying fuel to the compressed air, from the nozzles 251, 252, and 253 of the combustor 2. The rotor 4 is rotatably driven, because the combustion gas passes through the turbine stator vanes 32 and the turbine rotor blades 33 of the turbine 3. Electric power is generated by providing rotational power to the generator connected to the rotor 4. The exhaust gas having rotatably driven the rotor 4 is converted into static pressure by the exhaust diffuser 34a in the exhaust chamber 34 and released to the atmosphere.

Figure 4:
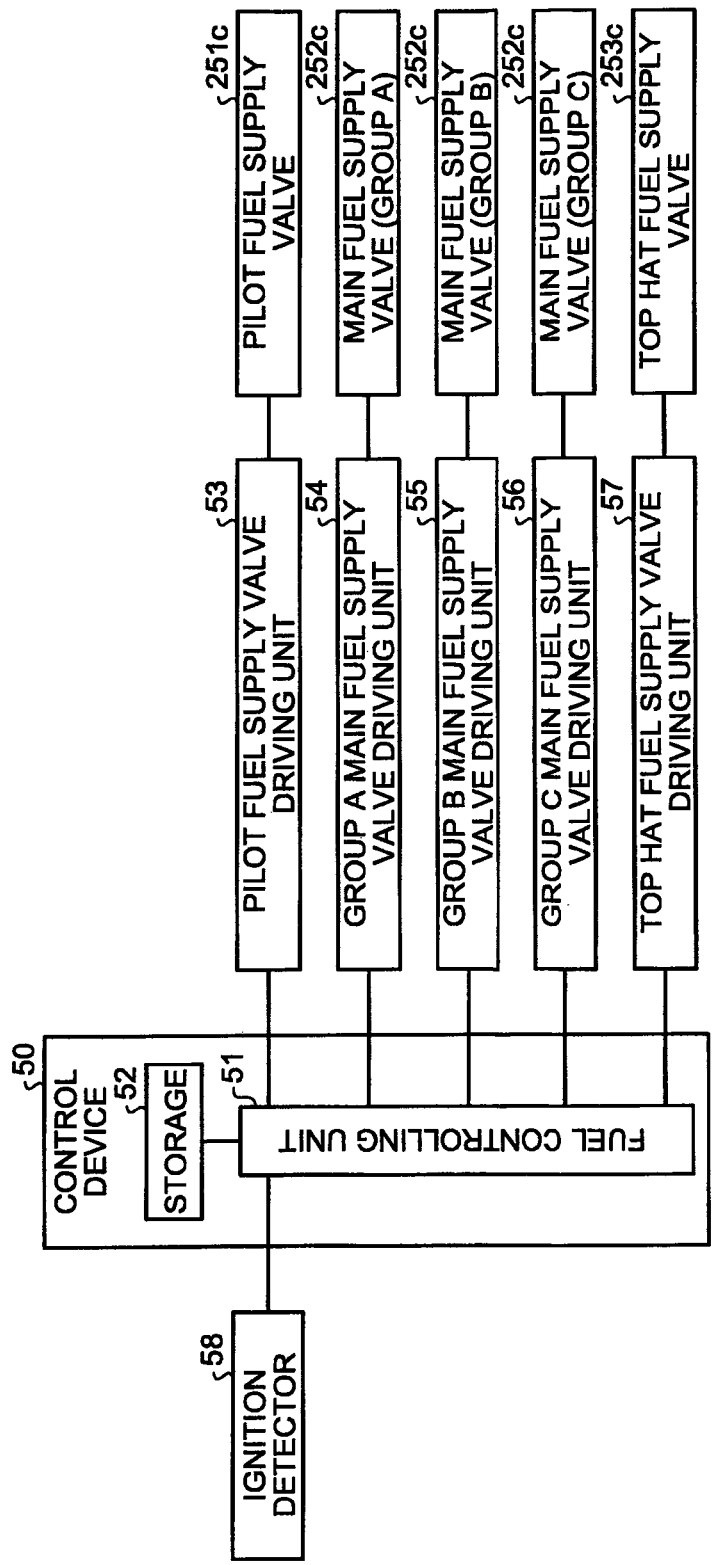
FIG. 4 is a schematic of a fuel control apparatus for a gas turbine according to the embodiment of the present invention.

FIG. 4 is a schematic of a fuel control apparatus for a gas turbine according to the embodiment of the present invention. As shown in FIG. 4, the fuel control apparatus includes a control device 50 formed by a microcomputer and the like. The control device 50 includes a fuel controlling unit 51. The control device 50 also includes a storage 52 connected to the fuel controlling unit 51. An operational state of the gas turbine such as a load of the gas turbine and a rotational speed of the rotor 4 is entered in the control device 50. The fuel controlling unit 51 is connected to the pilot fuel supply valve driving unit 53, the group A main fuel supply valve driving unit 54, the group B main fuel supply valve driving unit 55, the group C main fuel supply valve driving unit 56, and the top hat fuel supply valve driving unit 57. An ignition detector 58 for detecting an ignition state of the combustor 2 is connected to the fuel controlling unit 51. The fuel controlling unit 51 controls the pilot fuel supply valve driving unit 53, the group A main fuel supply valve driving unit 54, the group B main fuel supply valve driving unit 55, the group C main fuel supply valve driving unit 56, and the top hat fuel supply valve driving unit 57 so that the fuel controlling unit 51 supplies fuel to the nozzles 251, 252, and 253 according to programs and data stored in the storage 52 in advance and depending on the ignition state detected by the ignition detector 58.

The ignition detector 58, for example, detects ultra-violet rays from a flame. Although not shown, the combustors 2 aligned in the circumferential direction are connected with each other by connection pipes. The ignition detector 58 is arranged at a location opposite from each of the combustors 2 aligned in the circumferential direction, and detects the propagation of a flame to all the combustors 2 through the connection pipes.

Figure 5:
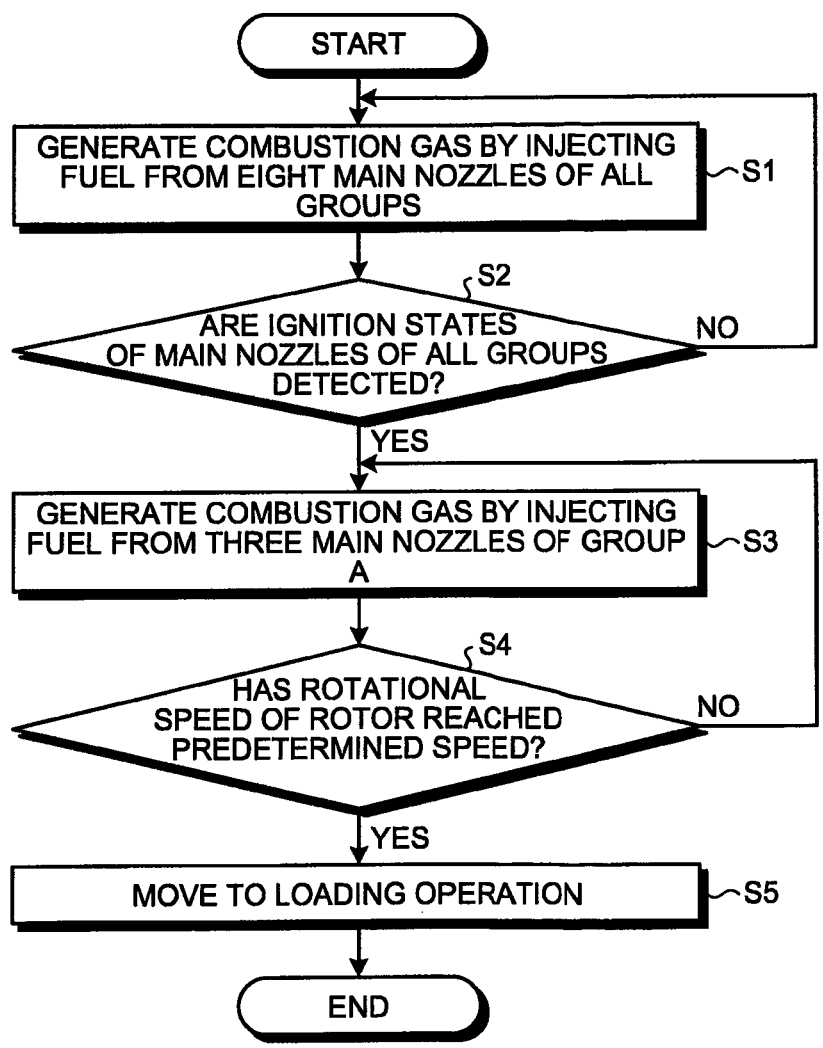
FIG. 5 is a flowchart for explaining fuel control carried out during ignition and acceleration.
Figure 6:
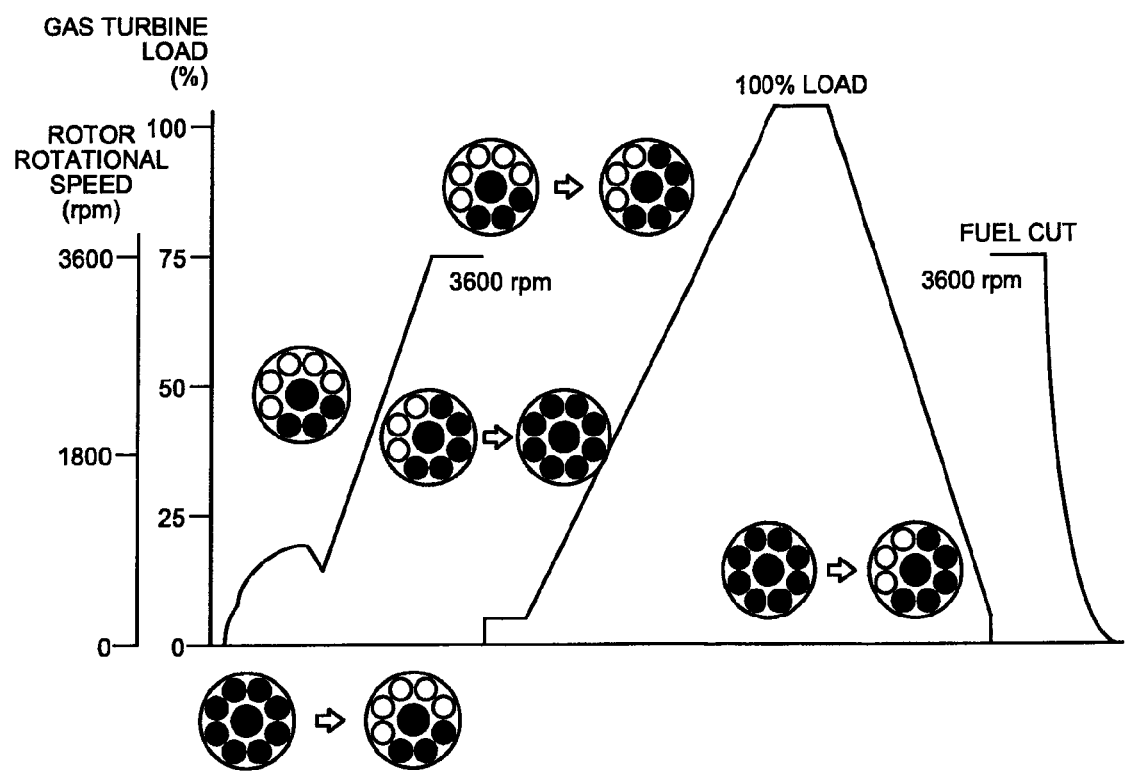
FIG. 6 is a schematic for explaining a fuel control method in association with an operation of the gas turbine.

Fuel control carried out by the fuel control apparatus will be described. Fuel control carried out during ignition and acceleration of the gas turbine will now be described. FIG. 5 is a flowchart for explaining fuel control carried out during ignition and acceleration. FIG. 6 is a schematic for explaining a fuel control method in association with an operation of the gas turbine.

Before the gas turbine is started while it is stopped, the fuel controlling unit 51 closes the pilot fuel supply valve 251*c* using the pilot fuel supply valve driving unit 53, closes the main fuel supply valves 252*c* of each group using the group A main fuel supply valve driving unit 54, the group B main fuel supply valve driving unit 55, and the group C main fuel supply valve driving unit 56, and closes the top hat fuel supply valve 253*c* using the top hat fuel supply valve driving unit 57.

As shown in FIGS. 5 and 6, to start the gas turbine from the stop state by igniting the combustor 2, the fuel controlling unit 51 opens the pilot fuel supply valve 251*c* using the pilot fuel supply valve driving unit 53, and produces a flame with fuel injected from the pilot nozzle 251. The fuel controlling unit 51 also opens the main fuel supply valves 252*c* of each group using the main fuel supply valve driving units 54, 55, and 56 of each group, and generates combustion gas by injecting fuel from eight main nozzles 252 of all the groups (Step S1). When the ignition detector 58 detects the ignition states of all the combustors 2 (YES at Step S2), the fuel controlling unit 51 closes the main fuel supply valves 252*c* using the group B and group C main fuel supply valve driving units 55 and 56, respectively. In other words, combustion gas is generated by injecting fuel only from three main nozzles 252 of the group A (Step S3). Until the rotational speed of the rotor 4 of the gas turbine reaches a predetermined speed (such as 3600 revolutions per minute (rpm)), that is, an acceleration operation range, the fuel controlling unit 51 gradually increases the fuel supply amount to the main nozzles 252 of the group A, using the main fuel supply valve 252*c*. When the rotational speed of the rotor 4 has reached a predetermined speed (such as 3600 rpm) (YES at Step S4), the process is moved to the following loading operation (Step S5), thereby finishing the fuel control carried out during ignition and acceleration of the gas turbine.

Figure 7:
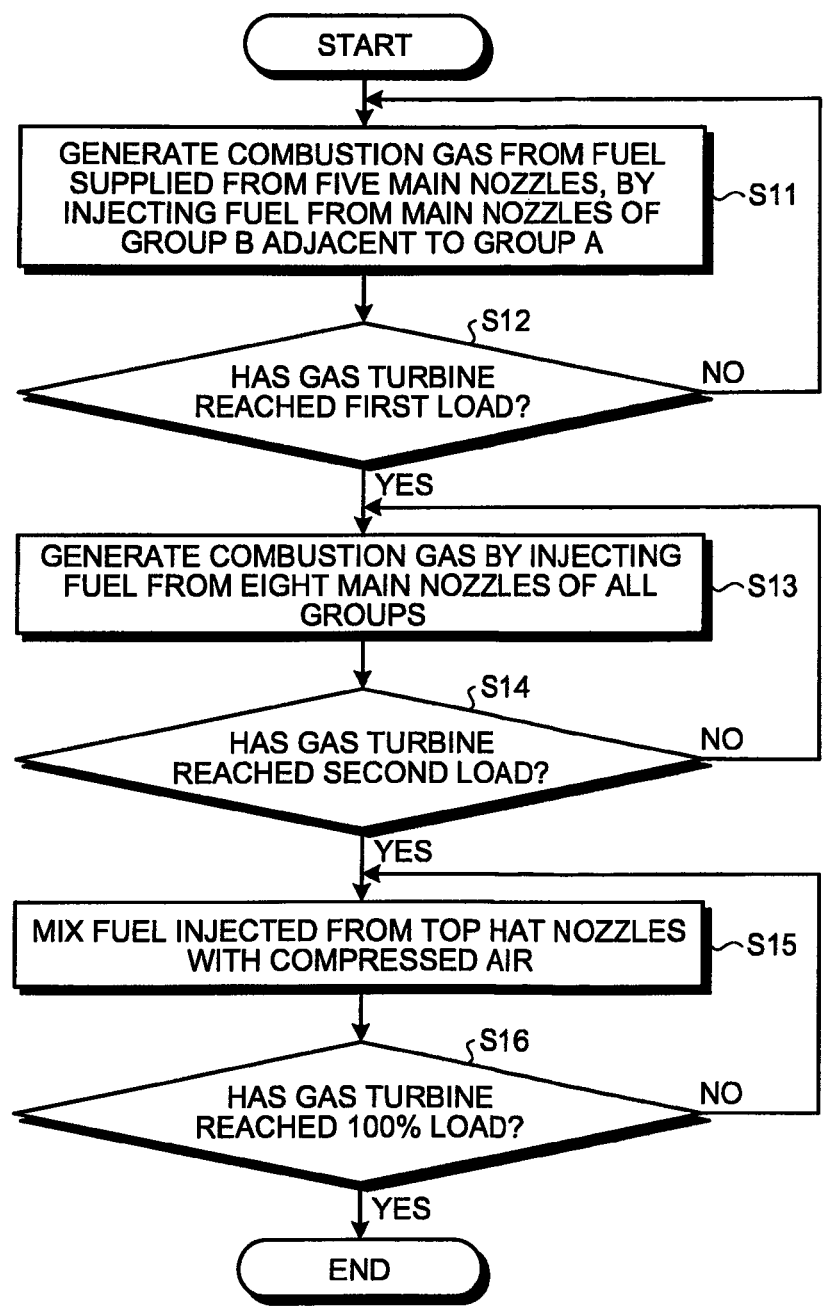
FIG. 7 is a flowchart for explaining fuel control carried out during loading operation.

Fuel control carried out during loading operation of the gas turbine will now be described. FIG. 7 is a flowchart for explaining fuel control carried out during the loading operation.

As shown in FIGS. 6 and 7, in the loading operation, when the rotational speed of the rotor 4 of the gas turbine has reached a predetermined speed (such as 3600 rpm), from the state when fuel is injected from the three main nozzles 252 of the group A during acceleration, the fuel controlling unit 51 opens the main fuel supply valve 252*c* of the group B using the group B main fuel supply valve driving unit 55. In other words, in addition to the main nozzles 252 of the group A, fuel is injected from the main nozzles 252 of the group B adjacent to the group A, and combustion gas is generated from the fuel supplied from the five main nozzles 252 of the group A and the group B (Step S11). The fuel supply amount to the main nozzles 252 of the group A and the group B are then gradually increased by each of the main fuel supply valves 252*c*, and when the gas turbine has reached a predetermined first load (such as from 8% to 10% load) (YES at Step S12), the fuel controlling unit 51 opens the main fuel supply valve 252*c* of the group C using the group C main fuel supply valve driving unit 56. In other words, fuel is injected from the main nozzles 252 of all the groups, and combustion gas is generated from the fuel supplied from the eight main nozzles 252 of all the groups (Step S13). When the gas turbine has reached a predetermined second load (such as 15% load) (YES at Step S14) by gradually increasing the fuel supply amount to the main nozzles 252 of all the groups, using the main fuel supply valves 252*c*, the fuel controlling unit 51 opens the top hat fuel supply valve 253*c* using the top hat fuel supply valve driving unit 57. In other words, a fuel-air mixture is produced by mixing compressed air with fuel injected from the top hat nozzles 253, and the fuel-air mixture is poured into the inner cylinder 21 (Step S15). The fuel controlling unit 51 maintains the state at Step S15 until the gas turbine reaches 100% load (Step S16), thereby finishing the fuel control carried out during the loading operation of the gas turbine.

Figure 8:
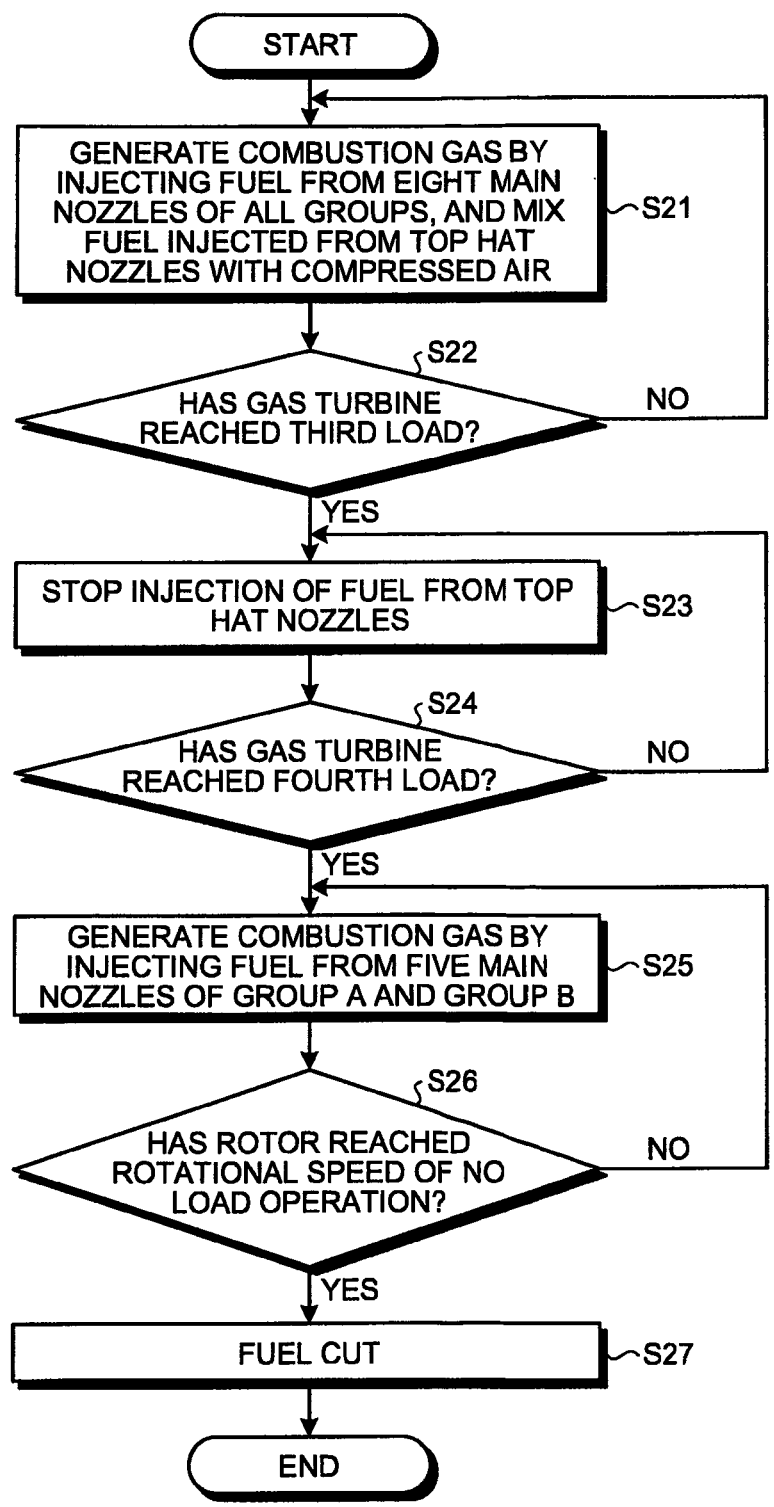
FIG. 8 is a flowchart for explaining fuel control carried out during unloading operation.

Fuel control carried out during unloading operation of the gas turbine will now be described. FIG. 8 is a flowchart for explaining fuel control carried out during the unloading operation.

As shown in FIGS. 6 and 8, in the unloading operation, the fuel controlling unit 51 maintains the state at Step S15 until a predetermined third load (such as 12% load) is reached from 100% load of the gas turbine, by gradually reducing the fuel supply amount to the main nozzles 252 of all the groups using the main fuel supply valves 252*c*. In other words, combustion gas is generated from the fuel injected from the main nozzles 252 of all the groups, and a fuel-air mixture is produced by mixing the fuel injected from the top hat nozzles 253 with compressed air. Accordingly, the fuel-air mixture is poured into the inner cylinder 21 (Step S21). When the gas turbine has reached the predetermined third load (such as 12% load) (YES at Step S22), the fuel controlling unit 51 closes the top hat fuel supply valve 253*c* using the top hat fuel supply valve driving unit 57. In other words, the fuel controlling unit 51 stops the injection of fuel from the top hat nozzles 253 (Step S23). The fuel controlling unit 51 then gradually reduces the fuel supply amount to the main nozzles 252 of all the groups using the main fuel supply valves 252*c*, and when the gas turbine has reached a predetermined fourth load (such as 8% load) (YES at Step S24), the fuel controlling unit 51 closes the main fuel supply valve 252*c* of the group C, using the group C main fuel supply valve driving unit 56. In other words, the fuel controlling unit 51 stops the injection of fuel from the main nozzles 252 of the group C, and generates combustion gas from the fuel supplied from the main nozzles 252 of the group A and the group B (Step S25). To stop the gas turbine, the fuel controlling unit 51 gradually reduces the fuel supply amount to the main nozzles 252 of the group A and the group B, using the main fuel supply valves 252*c*, and when the rotor 4 of the gas turbine has reached a rotational speed (such as 3600 rpm) of the acceleration operation (no load operation) (YES at Step S26), the fuel controlling unit 51 closes the main fuel supply valves 252*c* of the group A and the group B, using the group A and group B main fuel supply valve driving units 54 and 55. In other words, the fuel controlling unit 51 stops the injection of fuel from the main nozzles 252 of all the groups. The fuel controlling unit 51 also cut the fuel by closing the pilot fuel supply valve 251*c* using the pilot fuel supply valve driving unit 53 (Step S27), thereby finishing the fuel control carried out during the unloading operation of the gas turbine.

In this manner, in the fuel control method and the fuel control apparatus for a gas turbine, and the gas turbine, during acceleration of the gas turbine, fuel is supplied from three main nozzles 252 of the group A adjacently arranged to each other. Because combustion gas is generated by injecting all the fuel from the three main nozzles 252 during the acceleration operation (no load operation), the fuel flow rate per one main nozzle is increased. Accordingly, the fuel-air ratio (fuel flow rate/air flow rate) in the combustion region is increased, thereby improving the combustion characteristics. As a result, the generation of carbon monoxide (CO) and unburned hydrocarbon (UHC) can be reduced. Because the combustion characteristics are improved, a bypass valve that has been used is not necessary, thereby reducing manufacturing costs.

Upon ignition of the combustor, fuel is supplied from the eight main nozzles 252 of all the groups, and then the fuel is injected from the three main nozzles 252 of the group A. Because the entire area of the combustor 2 is burned at startup, it is possible to propagate a flame from this combustor to all the combustors being arranged. Consequently, it is possible to improve the ignition characteristics of the whole gas turbine (whole combustors).

During acceleration of the gas turbine, it is preferable to supply fuel from the main nozzles 252 less than the total number of the main nozzles 252 of the combustor 2 to reduce the generation of carbon monoxide (CO) and unburned hydrocarbon (UHC). In particular, to obtain the fuel-air ratio for further reducing the generation of carbon monoxide (CO) and unburned hydrocarbon (UHC), it is preferable to supply fuel from less than a half of the total number of the main nozzles 252 of the combustor 2. More specifically, as described above, during acceleration of the gas turbine, it is more preferable to supply fuel from the three main nozzles 252 among the total of eight main nozzles 252. In other words, it is preferable to supply fuel from the main nozzles 252 of about 37% (37%±7%) of the total main nozzles 252. 37%±7% of the total main nozzles 252, for example, is assumed when fuel is supplied from three main nozzles 252 during acceleration among the total of ten main nozzles, or when fuel is supplied from four main nozzles 252 during acceleration among the total of nine main nozzles.

During acceleration of the gas turbine, the main nozzles 252 of the combustor 2 may be divided into two groups, instead of dividing the main nozzles 252 of the combustor 2 into three groups, as described above. For example, the total of eight main nozzles 252 may be divided into two groups of three and five main nozzles. In other words, fuel may be supplied from the total of eight main nozzles and ignited at startup of the gas turbine, and the fuel may then be supplied from three main nozzles of one group during the subsequent acceleration operation of the gas turbine. Specifically, during ignition and acceleration of the gas turbine, the main nozzles for supplying fuel may be divided into at least two groups, and fuel is supplied from the main nozzles of all the groups at startup of the gas turbine, and the fuel is then supplied from at least one group of the main nozzles during the subsequent acceleration operation of the gas turbine.

In the fuel control method and the fuel control apparatus for a gas turbine, and the gas turbine, during the loading operation of the gas turbine, fuel is supplied from the five main nozzles 252 of the group A and the group B, until the first load (such as from 8% to 10% load) of the gas turbine. Because combustion gas is generated by injecting all the fuel from five main nozzles 252 during the loading operation, the fuel flow rate per one main nozzle is increased. Accordingly, the fuel-air ratio (fuel flow rate/air flow rate) in the combustion region is increased, thereby improving the combustion characteristics. As a result, the generation of carbon monoxide (CO) and unburned hydrocarbon (UHC) can be reduced. Because the combustion characteristics are improved, a bypass valve that has been used is not necessary, thereby reducing manufacturing costs.

When the operation is changed from the acceleration operation to the loading operation, the fuel is controlled so that the fuel is injected from the five main nozzles 252 instead of from three main nozzles 252. To do so, as described above, eight main nozzles 252 of the combustor 2 may be divided into two groups of three and five main nozzles, and the injection of fuel from the three nozzles of one group is stopped, and switched to the injection of fuel from the five main nozzles of the other group. However, in this fuel control, the fuel supplied from the main nozzles of one group needs to the cut, and the fuel needs to be supplied from the main nozzles of the other group anew. In other words, in the combustion cylinder, the combustion in a region of the main nozzles of one group where the temperature is high is stopped, and the combustion in a region of the main nozzles of the other group where the temperature is low is started. Accordingly, the high-temperature region becomes low-temperature, and the low-temperature region becomes high-temperature, thereby increasing the thermal stress difference between the regions in the combustion cylinder. Consequently, the durability of the transition piece is reduced. As this fuel control, when the injection of fuel from the three main nozzles of one group is switched to the injection of fuel from the five main nozzles of the other group, combustion is performed temporarily by the eight main nozzles. Consequently, the fuel flow rate per one nozzle is reduced in whole, thereby degrading the combustion characteristics. As a result, not only the generation of carbon monoxide (CO) and unburned hydrocarbon (UHC) are increased, but the operation of the gas turbine may vary temporarily due to the combustion instability.

In this respect, in the fuel control method and the fuel control apparatus for a gas turbine, and the gas turbine of the present embodiment, when the operation is changed from the acceleration operation to the loading operation, fuel is supplied from the two main nozzles 252 of the group B (second group) adjacent to the three main nozzles 252 of the group A (first group), and the combustion is performed by supplying fuel from the total of five main nozzles 252 by adding the two main nozzles 252 of the group B to the three main nozzles of the group A. Accordingly, the thermal stress difference generated between the regions in the combustion cylinder is reduced, thereby improving the durability of the transition piece 22. It is also possible to operate the gas turbine without variation. In the fuel control method and the fuel control apparatus for a gas turbine of the present embodiment, in addition to the region of the three main nozzles 252 of the group A in combustion, the region of the adjacent two main nozzles 252 of the group B are also burned. Consequently, the combustion characteristics of the combustor 2 can be improved, by propagating the flame of the region of the main nozzles 252 of the group A to the main nozzles 252 of the group B.

After the first load of the gas turbine, combustion gas is generated by injecting all the fuel from all the main nozzles 252. Accordingly, the fuel flow rate corresponding to the load of the gas turbine can be supplied, while reducing the generation of carbon monoxide (CO) and unburned hydrocarbon (UHC).

After the second load of the gas turbine, fuel is supplied from the top hat nozzles 253. Accordingly, NOx can be reduced by forming a uniform fuel-air mixture, by forming a fuel-air mixture by injecting fuel from the top hat nozzles 253 to the air flow of the compressed air, and forming a fuel-air premix by injecting fuel from the main nozzles 252 to the fuel-air mixture.

Until the rotational speed of the rotor 4 of the gas turbine has reached a predetermined speed after the acceleration of the gas turbine, fuel is supplied from less than a half of the total number of the main nozzles 252. Accordingly, the fuel-air ratio (fuel flow rate/air flow rate) to further reduce the generation of carbon monoxide (CO) and unburned hydrocarbon (UHC) can be obtained.

Until the first load of the gas turbine, fuel is supplied from more than a half of but less than the total number of the main nozzles 252. Accordingly, the fuel-air ratio (fuel flow rate/air flow rate) to further reduce the generation of carbon monoxide (CO) and unburned hydrocarbon (UHC) can be obtained, depending on the load of the gas turbine.

The main nozzles 252 of the group B may be formed by the main nozzles 252 at the both sides of the group A adjacent thereto. Accordingly, the thermal stress difference generated between the regions in the combustion cylinder can be reduced, thereby improving the combustion characteristics of the combustor 2. The main nozzles 252 of the group B are formed as a group of two aligned main nozzles 252 adjacent to the group A. By forming the groups in this manner, the main fuel lines 252b of the main nozzles 252 can be arranged collectively. Consequently, the installation space of the main fuel lines 252b can be reduced, thereby reducing the size of the combustor 2.

INDUSTRIAL APPLICABILITY

In this manner, the fuel control method and the fuel control apparatus for a gas turbine, and the gas turbine, according to the present invention can advantageously improve the ignition characteristics of the combustor upon ignition, while reducing manufacturing costs and increasing the fuel-air ratio in the combustion region during acceleration.

EXPLANATIONS OF LETTERS OR NUMERALS 1 compressor
2 combustor
21 inner cylinder
22 transition piece
23 outer casing
24 combustor casing
251 pilot nozzle
251a fuel port
251b pilot fuel line
251c pilot fuel supply valve
252 main nozzle
252a fuel port
252b main fuel line
252c main fuel supply valve
252d swirler vanes
252e burner tube
253 top hat nozzle
253a fuel port
253b top hat fuel line
253c top hat fuel supply valve
26 air passage
3 turbine
4 rotor
R shaft center
50 control device
51 fuel controlling unit
52 storage
53 pilot fuel supply valve driving unit
54 group A main fuel supply valve driving unit
55 group B main fuel supply valve driving unit
56 group C main fuel supply valve driving unit
57 top hat fuel supply valve driving unit
58 ignition detector

The invention claimed is:

1. A fuel control apparatus for a gas turbine with a combustor being formed of at least two groups of pluralities of main nozzles for supplying fuel, with fuel supply valves being provided for each group of the main nozzles and supplying fuel to the main nozzles, the fuel supply valves being opened to change a supply amount of the fuel and being closed to prevent fuel from being supplied, and with an ignition detector detecting an ignition state of the combustor, the fuel control apparatus for a gas turbine comprising:
a fuel controlling unit that, during ignition and acceleration but before loading of the gas turbine, is configured to control opening of the fuel supply valves of the main nozzles of all groups upon ignition of the combustor but before loading of the gas turbine, and after the ignition detector detects ignition of the combustor, while keeping the fuel supply valve of the main nozzles of at least one group excluding all groups open, closes the fuel supply valve(s) of the main nozzles of other group(s) during acceleration of the gas turbine.

2. The fuel control apparatus for a gas turbine according to claim 1, wherein the main nozzles of the group that supply fuel during acceleration of the gas turbine are adjacently arranged to each other.

3. The fuel control apparatus for a gas turbine according to claim 1, wherein number of the main nozzles of a group that supply fuel during acceleration of the gas turbine is less than a half of total number of the main nozzles.

4. A gas turbine that supplies combustion gas, obtained by supplying fuel to compressed air compressed by a compressor and burning the combustion gas and the fuel in a combustor, to a turbine to generate power, the gas turbine comprising:
a combustor being formed of at least two groups of pluralities of main nozzles for supplying fuel;
fuel supply valves being provided for each group of the main nozzles and supply fuel to the main nozzles are opened to change a supply amount of the fuel and closed to prevent fuel from being supplied;
an ignition detector that detects an ignition state of the combustor; and
a fuel control apparatus that, during ignition and acceleration but before loading of the gas turbine, is configured to control opening of the fuel supply valves of the main nozzles of all groups upon ignition of the combustor but before loading of the gas turbine, and after the ignition detector detects the ignition of the combustor, while keeping the fuel supply valve of the main nozzles of at least one group excluding all groups open, closes the fuel supply valve(s) of the main nozzles of other group(s) during acceleration of the gas turbine.

* * * * *